Sept. 23, 1969  B. MOSIER  3,468,303
PLATED ELECTRODES
Filed Jan. 5, 1967
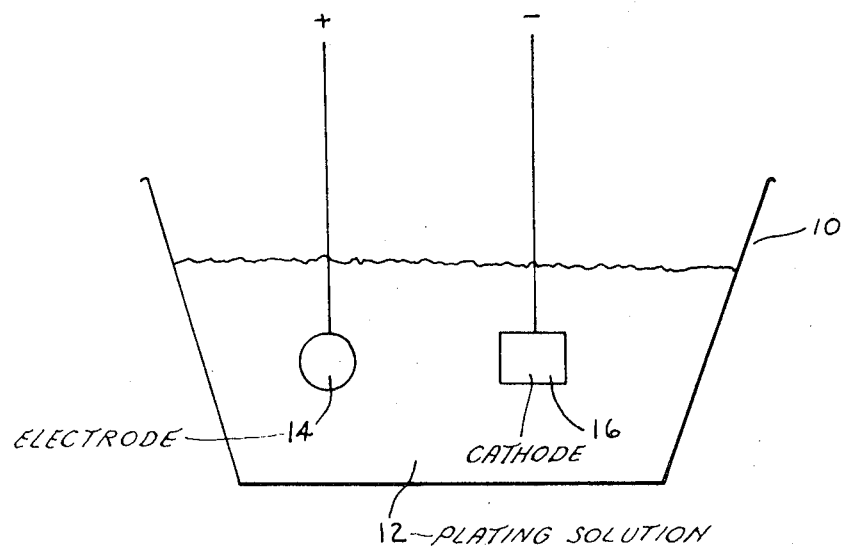
Benjamin Mosier  INVENTOR.
BY Donald Gunn
Attorney

United States Patent Office 3,468,303
Patented Sept. 23, 1969

3,468,303
PLATED ELECTRODES
Benjamin Mosier, Houston, Tex., assignor to the United States of America as represented by the Administrator of the National Aeronautics and Space Administration
Filed Jan. 5, 1967, Ser. No. 607,484
Int. Cl. A61b 5/04
U.S. Cl. 128—2.1           8 Claims

ABSTRACT OF THE DISCLOSURE

In biopotential electrodes, the preferred embodiment including a silver member and a silver salt and a hydrophilic protein colloid electrolytically deposited in the structural matrix at the surface of the silver electrode.

Summary of problem and solution

The present invention relates to an improved electrode, and more particularly relates to an electrode having long life wherein poisoning by organic molecules is prevented by an ion selective electrolytic deposition of a hydrophilic protein colloid.

Electrodes used for long term monitoring of physiological data from living bodies such as human subjects have encountered problems best described as changes in the electrode itself which produce unreliable electrical data. One change in the electrode is the build-up or increase in electrical resistance at the surface of the electrode after prolonged use. In the typical application, the electrode is contacted against the skin of the subject. The subject usually perspires and a number of large molecule, organic chemical are interposed at the surface of the skin and taken into the electrode. Chemical poisoning is the aftermath of a prolonged exposure to the perspiration wherein some organic compounds alter the electrical characteristics of the electrode. Typical poisoning compounds are sulfur-containing compounds such as mercaptids or glutathione. An increase of the surface resistivity of the contact electrode prevents recordal of accurate data due to the fact that the bioelectric potentials are extremely small and increased ohmic drop across the surface resistance can attenuate the bioelectric potential.

A related problem in long term electrode application to a living subject is the problem of avoiding skin irritation and, indeed, not permitting or promoting bacterial growth between the electrode and skin. It has been found that the present invention has a certain compatibility with the skin of the subject that avoids skin irritations and infections.

The skin-electrode junction potential is a third important factor in biopotential electrodes. Not only should the potential be small, but it should remain constant after the passage of time. Otherwise, the data will require excessive correction to compensate for drift of the skin-electrode junction potential, even assuming the drift over a period of time is predictable. Of course, additional problems will be recognized in the requirements of long term applications for sensors such as the present electrodes which include insensitivity to vibration, structural reliability, and the like.

In the present invention, it is summarized as incorporating a silver electrode which is electrolytically plated with a metallic halogen salt and includes in the electrolytic solution a hydrophilic gelatin colloid whereby a selective ion screen is formed on the surface and in the electrode which permits the passage of metallic ions in communicating bioelectrical signals to the electrode but which blocks large protein molecules typically found in perspiration and which tend to poison the electrode by causing nonreversible chemical changes therein. With the problem above stated in view, and in further view of the limitations of the prior art, it is, therefore, an object of the present invention to provide a new and improved plated electrode permitting chemically reversible ionic interchanges with metal salts of the body typically found in perspiration and yet which forbids entry of large molecules which react irreversibly to poison the electrode.

Another object of the present invention is to provide a new and improved plated electrode which receives an anodizing salt and colloidal protein in a coating which is impervious to typical protein molecules found in perspiration.

A particular object of the present invention is to provide a new and improved gelatin plated electrode preventing poisoning by perspiration products such as mercaptids or glutathione.

A further object of the present invention is to provide a new and improved low noise electrode which does not promote or permit bacterial growth and which does not irritate the skin because of the compatibility of collagen in the electrode with the skin of the user.

Yet another object of the present invention is to provide a new and improved plated electrode having silver-silver chloride-gelatin matrix pervious to selected ion sizes and impervious to larger ion sizes.

Other objects and advantages of the present invention will become more readily apparent from a consideration of the drawing wherein the drawing illustrates one electrolytic plating technique for use with the present invention.

In the drawing, the number 10 indicates a container for receiving a liquid 12 therein for use in anodizing a silver member 14. A cathode of appropriate construction is provided at 16, and appropriate electrical connections are made whereby the anode 14 is communicated with a positive voltage source and the cathode 16 is communicated with the negative terminal of the source.

The silver member 14 is preferably made of jeweler's fine quality silver and is precut to a selected size. The gauge or thickness of the silver is not critical but should be sufficient to maintain mechanical integrity. The electrolyte 12 is preferably a metal salt of a halogen such as potassium chloride in solution to provide approximately 0.1 molarity solution. Added thereto is a gelatin (see definition in the Condensed Chemical Dictionary, Reinhold Publishing Company, seventh edition) which has a positive charge and a relatively high isoelectric point in the range corresponding to a pH of 8 to 9. The preferred quantity of gelatin is approximately 0.1% of the electrolytic solution by weight. As the current is passed through the electrolytic solution between the plates 14 and 16, coulombic attractive forces form a plating of ions on the silver member 14 which yields an ion selective screen or matrix structure on the silver member 14 whereby poisoning of the electrode during long term use is prevented by the screen which excludes large protein molecules which combine irreversibly with the electrode.

Of particular interest to the gelatin coated electrode after electrolytically plating the protective coating on the member 14 is the low skin-electrode junction potential of the electrode in comparison with other commercially available electrodes. Reference is made to the table below which lists a number of electrodes for purposes of comparison.

| Electrode: | Potential |
|---|---|
| Silver-silver chloride-gelatin | microvolts__ 209 |
| Standard calomel | do____ 550 |
| Mennan-Greatbatch | do____ 600 |
| Tursky | millivolts__ 1 |
| Beckman | do____ 1.92 |
| Luccina | do____ 3 |

In the routine operation of biopotential electrodes in long term projects, it will be noted that the above indicated offset of the preferred embodiment is a minimum source of error in the data derived from the electrode.

Other characteristics of the gelatin-plated electrode will be noted in detail hereinafter in considering additional examples of fabrication of the device of the present invention.

Several electrodes have been fabricated by depositing a combined layer of silver chloride and isoelectric gelatin on the silver member 14 from a 1.0 molarity solution of potassium chloride in which current densities of upwards of ten coulombs per square centimeter provided the electromotive force for the plating process. The current density rate has been typically in the range of two milliamperes per square centimeter. On occasion, it has been found helpful to remove absorbed contaminants by washing the electrode for a period of approximately ten days in distilled water with frequent changes in water and agitation. In the preferred embodiment above noted, approximately five percent of the silver was converted to silver chloride at the surface and the above-noted percentages are the preferred relationship between the silver and the silver chloride for the silver-silver chloride electrode.

By and large, the electrodes of the present invention are reasonably low in impedance, something on the order of a few ohms per square centimeter for DC signals and AC signals of upwards of 20 or 30 Hertz.

Other examples of the electrolyte 12 may be given. The use of a variety of metal-halogen compounds such as potassium fluoride, potassium bromide, or potassium iodide are possible.

The present invention is particularly useful in terms of preventing bacterial growth or encouragement of infectious activity at the skin of the subject since the gelatin is similar to one constituent (collagen) of human skin. During long term monitoring operations, this is of significant benefit since the comfort of the subject becomes relatively important.

A few limits or constraints of a practical nature encountered in preparation of the present invention should be noted. For instance, if the electroplating current is too high, there is a possibility of forming unwanted stresses in the electrode or unusual crystalline growths on the metallic anode whereby the completed electrode is not usable. Therefore, it is suggested that current densities not exceed four or five milliamperes per square centimeter in the process of the present invention. In like manner, the molarity of the solution 12 comprising the electrolyte and gelatin should not vary too widely beyond the above-noted 0.1 molarity solution and the 1.0 molarity solution. Of course, these limits can be exceeded as a practical matter because they only indicate acceptable solution densities. The percentage of the completed electrode which is silver is preferably not more than 95%; however, it can range lower to perhaps 80%.

While all details of the present invention have not been fully investigated, one theory of operation advanced for purposes of explanation is that electrical current is conducted between the skin of the subject and the metallic (silver) member by ions provided by the silver salt and by the salt components in the perspiration on the skin. That is to say, the pure silver portions of the electrode are not contacted directly against the skin but rather, the electrolyte is in solution, so to speak, communicating the minute charges at the surface of the skin to the electrode. It should be noted that the skin is subject to continued perspiration and this provides an influx of additional chemicals to the immediate region of the electrode. Typically among these chemicals are metallic salts which are the products of perspiration. Metallic salts generally ionize relatively easily in reversible chemical interaction with the present invention. However, the products of perspiration also include complex protein molecules which are quite large and which form compounds which do not ionize. When the large organic molecules interact with the electrode, they deprive the conducting path of free ions and provide a permanent poisoning effect to the electrode. It is with this danger in view that the present invention is provided with an ion screen which has interstices or openings sufficiently small to permit the passage of ions of relatively simple salts. On the other hand, large molecules cannot pass through the ion screen and are therefore not permitted to enter into chemical combination with the metal or metal salt of the electrode proper. As also noted hereinbefore, typical elements of perspiration such as sulfur containing compounds mercaptids or glutaphione are also excluded from the electrode.

The ability to ionize of the silver salt protected by gelatin matrix provides an electrode which is particularly free of poisoning effect and does not require extensive depolarization. In further particular, the electrode resistance is substantially reduced so that the full biopotential signals are monitored for recording and later interpretation.

What is claimed is:

1. An electrode for monitoring physiological parameters such as the biopotential of a human subject comprising:
   (a) a silver member having an exposed surface for contact against the surface of the subject;
   (b) a metal salt of a halogen plated on the exposed surface of said silver member; and
   (c) a protective hydrophilic protein colloid bound in the matrix structure of the exposed surface.

2. The invention of claim 1 wherein said silver member is fine jeweler's grade quality silver, and said metal salt is electrolytically plated on said silver member.

3. The invention of claim 1 wherein said metal salt and said protective hydrophilic protein colloid are simultaneously electrolytically plated on said silver member.

4. The invention of claim 3 wherein said protective hydrophilic protein colloid is positively charged and has a relatively high isoelectric point corresponding to a pH of approximately 8 to 9.

5. The invention of claim 1 wherein the matrix structure on the exposed surface of said silver member forms an ion screen which excludes large ions typically found in the products of perspiration from exposure to the silver member.

6. The invention of claim 1 wherein said silver member comprises approximately 80% or more of said electrode but does not exceed approximately 95% thereof and said silver salt is substantially the remainder thereof.

7. The invention of claim 1 wherein said electrode potential is no greater than 209 microvolts.

8. The invention of claim 1 wherein said metal salt is electrolytically plated on said silver member from a halide acid.

References Cited

UNITED STATES PATENTS

| 2,029,386 | 2/1936 | Pine | 204—46 X |
| 2,934,480 | 4/1960 | Slomin | 204—56 X |
| 3,006,821 | 10/1961 | Haring | 204—56 X |
| 3,170,459 | 2/1965 | Phipps | 128—2.06 |
| 3,340,868 | 9/1967 | Darling | 128—2.06 |

WILLIAM E. KAMM, Primary Examiner

U.S. Cl. X.R.

204—56; 252—514